(12) United States Patent
Yu et al.

(10) Patent No.: US 7,902,792 B2
(45) Date of Patent: Mar. 8, 2011

(54) SIMULATOR OF SOFC FOR ELECTRIC CHARACTERISTICS

(75) Inventors: Dung-Di Yu, Taoyuan County (TW); Hung-Yu Wang, Taoyuan County (TW); Yung-Neng Cheng, Taoyuan County (TW); Ruey-Yi Lee, Taoyuan County (TW)

(73) Assignee: Atomic Energy Council-Institute of Nuclear Energy Research, Lungtan (TW)

(*) Notice: Subject to any disclaimer, the term of this patent is extended or adjusted under 35 U.S.C. 154(b) by 0 days.

(21) Appl. No.: 11/976,919

(22) Filed: Oct. 29, 2007

(65) Prior Publication Data
US 2010/0228535 A1 Sep. 9, 2010

(51) Int. Cl.
*H01M 10/44* (2006.01)
*H01M 10/46* (2006.01)

(52) U.S. Cl. .......... 320/101; 429/442; 429/444; 429/446
(58) Field of Classification Search .................. 320/101; 429/442, 444, 446
See application file for complete search history.

(56) References Cited

U.S. PATENT DOCUMENTS
2006/0234094 A1* 10/2006 Sakai .............................. 429/24
* cited by examiner

*Primary Examiner* — Edward Tso
*Assistant Examiner* — Samuel Berhanu
(74) *Attorney, Agent, or Firm* — Jackson IPG PLLC; Demian K. Jackson

(57) ABSTRACT

A simulator is used for developing a solid oxide fuel cell (SOFC). Through the simulator, electrical characteristics of the SOFC are examined. Thus, with the simulator, cost for developing the SOFC is saved.

4 Claims, 2 Drawing Sheets

SIMULATOR OF SOFC FOR ELECTRIC CHARACTERISTICS

FIELD OF THE INVENTION

The present invention relates to simulating a solid oxide fuel cell (SOFC); more particularly, relates to replacing a SOFC through a simulation to obtain electric characteristics of the SOFC and thus to save cost on developing the SOFC.

DESCRIPTION OF THE RELATED ART

Fuel cell has high efficiency on supplying power with relatively low cost. The fuel cell mainly uses hydrogen and oxygen to process an electrical reaction for producing electricity. Different fuel cells supplies different electricity to small facilities or even a big power plant. Among the fuel cells, SOFC has the best efficiency. Moreover, SOFC can be operated at a high temperature between 600 Celsius degrees (° C.) and 1000° C., and has a high-temperature exhaust.

However, its technology threshold is the highest as well. Unit cost of SOFC is pretty high. And its structure is not strong that it can be broken and not afford to serious operations. In addition, tests during developing SOFC are quite often. A big change on a factor of the SOFC may ruin the SOFC. As a result, cost for developing a SOFC is high. Hence, the prior art does not fulfill all users' requests on actual use.

SUMMARY OF THE INVENTION

The main purpose of the present invention is to replace a SOFC through a simulation to obtain electric characteristics and thus to save cost for developing the SOFC.

To achieve the above purpose, the present invention is a simulator of SOFC for electric characteristics, comprising a contacting unit comprising an anode part and a cathode part; a sensing unit connecting to the anode part and the cathode part; a sense analysis unit connecting to the sensing unit; and a load unit connecting to the sense analysis unit, where the sense analysis unit comprises a first A/D converter connecting to the sensing unit, an analysis unit connecting to the first A/D converter, a D/A converter connecting to the analysis unit, a power supply unit connecting to the D/A converter and a second A/D converter connecting to the power supply unit. Accordingly, a novel simulator of SOFC for electric characteristics is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
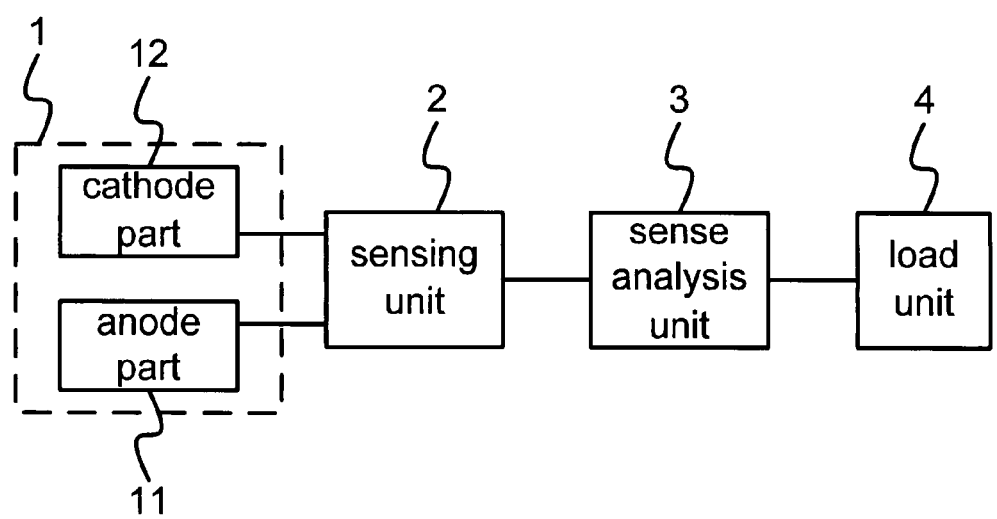
FIG. 1 is the view showing the preferred embodiment according to the present invention.
Figure 2:
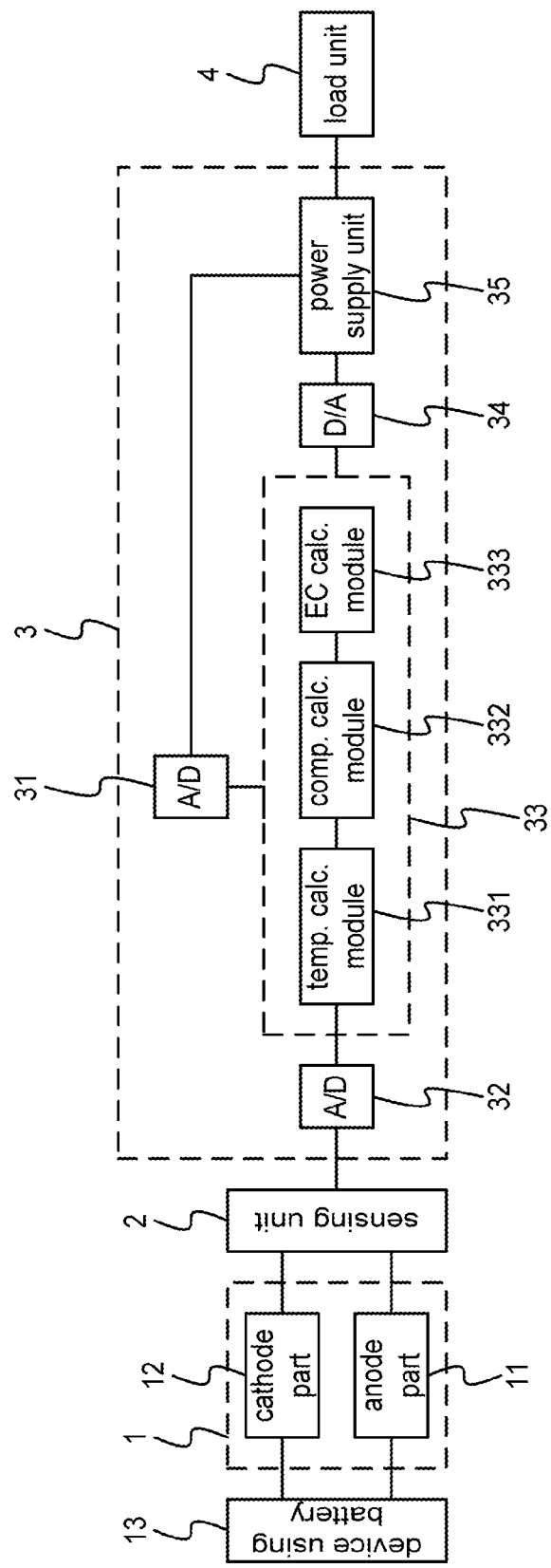
FIG. 2 is the view showing the simulation using the preferred embodiment.

Please refer to FIG. 1 and FIG. 2, which are views showing a preferred embodiment according to the present invention and a simulation using the preferred embodiment. As shown in the figures, the present invention is a simulator of SOFC for electric characteristics, comprising a contacting unit 1, a sensing unit 2, a sense analysis unit 3 and a load unit 4, where a solid oxide fuel cell (SOFC) is replaced with the present invention to test electric characteristics of the SOFC for saving cost for developing the SOFC.

The contacting unit 1 comprises an anode part 11 and a cathode part 12.

The sensing unit 2 is connected with the anode part 11 and the cathode part 12 of the contacting unit 1.

The sense analysis unit 3 comprises a first analog/digital (A/D) converter 32, an analysis unit 33, a digital/analog (D/A) converter 34, a power supply unit 35 and a second A/D converter 31, where the analysis unit comprises a temperature calculation module 331, a composition calculation module 332 and an electrochemical calculation module 333.

Thus, a novel simulator of SOFC for electric characteristics is obtained.

On using the present invention, a device using battery 1 is connected with the contacting unit 1, where fuels in the anode part 11 and the cathode part 12 of the contacting unit 1 are processed with a combined combustion and mixing. The sensing unit 2 senses a pressure, a plurality of component ratios and a temperature of the anode part 11 and the cathode part 12 of the contacting unit 1. Physical quantities of the pressure, the component ratios and the temperature are converted into digital signals by the first A/D converter 32 to be transferred to the analysis unit 33. Then electric characteristics obtained are converted into analog signals by the D/A converter 34 to be transferred to the power supply unit 35. Then a voltage and a current returned by the power supply unit 35 are converted into digital signals by the second A/D converter 31 to be transferred to the analysis unit 33. Data are then compared, analyzed and calculated by the temperature calculation module 331, the composition calculation module 332 and the electrochemical calculation module 333. Then data are converted into analog signals by the D/A converter 34 to be transferred to the power supply unit 35. And the analysis unit 33 controls supplies of voltage and current through an iterative operation at time intervals. Finally, a voltage and a current are outputted to the load unit 4 to be adjusted.

To sum up, the present invention is a simulator of SOFC for electric characteristics, where a SOFC is replaced through a simulation to obtain electric characteristics and thus to save cost on testing the SOFC.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A simulator of a solid oxide fuel cell (SOFC) for electric characteristics, comprising:

a contacting unit, said contacting unit comprising an anode part and a cathode part;

a sensing unit, said sensing unit connecting to said anode part and said cathode part;

a sense analysis unit, said sense analysis unit connecting to said sensing unit; and a load unit, said load unit connecting to said sense analysis unit, wherein said sense analysis unit comprises:
- a first analog/digital (A/D) converter, said first A/D converter connecting to said sensing unit;
- an analysis unit, said analysis unit connecting to said first A/D converter;
- a digital/analog (D/A) converter, said D/A converter connecting to said analysis unit;
- a power supply unit, said power supply unit connecting to said D/A converter; and
- a second A/D converter, said second A/D converter connecting to said power supply unit; wherein said contacting unit, said sensing unit, said sense analysis unit, and said load unit are electrically connected together and used to obtain electric characteristics of SOFC.

2. The simulator according to claim 1, wherein said sensing unit senses a pressure, a plurality of component ratios and a temperature.

3. The simulator according to claim 1, wherein said load unit adjusts electricity.

4. The simulator according to claim 1, wherein said analysis unit comprises a temperature calculation module, a composition calculation module and an electrochemical calculation module.

* * * * *